United States Patent
Sriganesh et al.

(10) Patent No.: US 9,600,456 B2
(45) Date of Patent: Mar. 21, 2017

(54) AUTOMATICALLY PERFORMING A WEB SERVICE OPERATION

(75) Inventors: Madhvanath Sriganesh, Bangalore (IN); Manjunath Geetha, Bangalore (IN); Kuchibhotla Anjaneyulu, Bangalore (IN); Vimal Sharma, Bangalore (IN); Mathur Nidhi, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 14/342,314

(22) PCT Filed: Aug. 30, 2011

(86) PCT No.: PCT/IN2011/000592
§ 371 (c)(1),
(2), (4) Date: Feb. 28, 2014

(87) PCT Pub. No.: WO2013/030843
PCT Pub. Date: Mar. 7, 2013

(65) Prior Publication Data
US 2014/0237352 A1     Aug. 21, 2014

(51) Int. Cl.
*G06F 3/00*     (2006.01)
*G06F 17/22*    (2006.01)
*G06F 17/30*    (2006.01)

(52) U.S. Cl.
CPC .... *G06F 17/2247* (2013.01); *G06F 17/30876* (2013.01)

(58) Field of Classification Search
CPC ..... G06Q 10/10; G06F 17/243; G06F 17/211; G06F 19/322; G06F 19/363
See application file for complete search history.

(56) References Cited

U.S. PATENT DOCUMENTS

| 7,665,064 B2 * | 2/2010 | Able | G06F 17/30861 717/117 |
| 2003/0152277 A1 * | 8/2003 | Hall, Jr. | G06K 9/033 382/229 |
| 2003/0154289 A1 | 8/2003 | Williamson et al. | |
| 2008/0120257 A1 | 5/2008 | Goyal et al. | |
| 2008/0189208 A1 | 8/2008 | Wilkie | |
| 2010/0048247 A1 | 2/2010 | Markison | |

(Continued)

FOREIGN PATENT DOCUMENTS

KR     20030081741 A     10/2003

OTHER PUBLICATIONS

ISR and WO in counterpart PCT patent application PCT/IN2011/000592, dated May 31, 2012.

*Primary Examiner* — Kyle Stork
(74) *Attorney, Agent, or Firm* — Mannava & Kang, P.C.

(57) ABSTRACT

In a method for automatically performing a web service operation, input regarding actions of a user performing a task on a web service are received, an automated web task from the received input is generated, in which the automated web task is to perform the received actions, In addition, an image containing an object is accessed, the object contained in the image is associated with the automated web task to cause the automated web task to be automatically performed by another image containing the object, and the association between the object and the automated web task is stored in a data store.

20 Claims, 5 Drawing Sheets

(56) References Cited

U.S. PATENT DOCUMENTS

| | | | |
|---|---|---|---|
| 2010/0082821 A1* | 4/2010 | Rosenblatt | G06F 15/16 |
| | | | 709/228 |
| 2010/0177964 A1 | 7/2010 | King et al. | |
| 2010/0260373 A1 | 10/2010 | Neven et al. | |
| 2010/0280873 A1 | 11/2010 | Bryant | |
| 2010/0331043 A1 | 12/2010 | Chapman et al. | |
| 2011/0055217 A1* | 3/2011 | Kamel | G06F 17/30867 |
| | | | 707/741 |
| 2013/0170738 A1* | 7/2013 | Capuozzo | G06F 17/30265 |
| | | | 382/159 |

* cited by examiner

AUTOMATICALLY PERFORMING A WEB SERVICE OPERATION

BACKGROUND

Web services are web applications that can be invoked via a Uniform Resource Locator (URL). Web service interfaces are typically complex as they require a user to remember websites, perform complex navigations, fill multiple forms and/or undertake a sequence of action, often across multiple sites, in order to accomplish a specific task. This can be further complicated in the field of mobile communication where difficulties may be provided due to mobile device limitations (such as screen size, functionality restrictions, etc.) and connectivity issues, for example.

An appliance or widget model for customized packaging of complex actions or configurations to perform a specific single function is a known paradigm of simplification. For example, a weather widget may be activated to obtain weather information. Since different users perform different personal tasks on the web, and possibly in diverse ways, use of pre-packaged widgets does not scale. Also, creating a personal widget or appliance today means development of new web applications which mandates programming knowledge at least one of Java, JSP, Servlets, AJAX, JavaScript, Flex or similar technologies.

BRIEF DESCRIPTION OF THE DRAWINGS

Features of the present disclosure will become apparent from the following description with reference to the figures, in which.

DETAILED DESCRIPTION

For simplicity and illustrative purposes, the present disclosure is described by referring mainly to an example thereof. In the following description, numerous specific details are set forth to provide a thorough understanding of the present disclosure. However, it will be apparent that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are a method, apparatus, and computer-readable storage medium for automatically performing a web service operation. More particularly, the method, apparatus, and computer-readable storage medium disclosed herein enable an image of an object to automatically trigger performance of an automated web task on a user's apparatus. In one regard, the object is associated with the automated web task through an authoring operation in which a user's actions with respect to the web service is tracked and stored. In addition, the automated web task is generated from the user's tracked actions, in which, performance of the web task causes the same actions on the web service to be automatically performed. The association of the object and the automated web task is stored in a local and/or remote data store and may be supplied to other users. As discussed herein, web services may include applications using conventional website-based or portal-based interfaces.

The user's actions or tasks with respect to a web service are described herein as a web task or TaskLet, which represents a task-based personal interaction pattern and also provides a platform for automatically creating, sharing, and executing TaskLets. A TaskLet is used to capture and represent a user's way of accomplishing a task. These TaskLets may be user-created, shared, customized and composed with other TaskLets and web services.

As also disclosed herein, the web service operation may automatically be performed on a user apparatus, such as a cellular telephone having web access capabilities. More particularly, the web service operation may automatically be performed on the user apparatus in response to receipt of an image containing a second object that contains a feature that triggers performance of the automated web task to provide the web service operation.

Through implementation of the method, apparatus, and computer-readable storage medium disclosed herein, an authored web task may be implemented on a user apparatus having a relatively small display screen. In one regard, the web task may be authored on a computing device having a relatively large display screen, for instance, a personal computer, which provides a rich interface for accessing a website or web portal. In addition, the web task may be performed on a portable electronic device having a relatively small display screen, for instance, a cellular telephone, a personal digital assistant, a smart phone, etc., whose relatively small display screen makes it relatively difficult to perform actions at a website. In this regard, the portable electronic device may be implemented to automatically perform the same actions on the web service that were authored on the computing device. In addition, a person who is relatively more proficient with computing devices may author and the web task and the web task may be implemented by users having a lower level of proficiency.

According to an example, the identification of the automated web task may include identification of a list of different automated web tasks that are associated with the object. In this example, the user may be prompted to select one of the listed automated web tasks prior to performance of the automated web task. The list of automated web tasks may include, for instance, payment of a bill, setting up a payment reminder, accessing a train departure time and status, contacting support personnel, etc.

By way of particular example, the automated web task may comprise accessing a utility company's website and paying for a utility bill using a paper copy of the utility bill. In this example, a user may capture an image of the utility bill on the user apparatus and the user apparatus may identify an automated web task that is associated with the utility bill. This determination may be made by identifying the image of the utility bill or a portion of the utility bill, such as, a logo or other identifier, and identifying the automated web task that is associated with the identified image. In addition, the automated web task is performed to, for instance, cause the user apparatus to visit the utility company's website. In addition, the automated web task may automatically input various information to gain access to the user's account, such as, the user's account number, the user's password, etc. In a particular example, the automated web task may be set up to retrieve the user's account number from the utility bill and to automatically populate the proper section on the utility company's website with the user's account number. In addition, the user may be prompted to enter their password for security purposes. The automated web task may automatically input additional information including, for instance, the payment amount, the payment amount, etc., which may be obtained from the image of the utility bill. In addition, or alternatively, the user may be prompted for entry of the additional information.

Figure 1:
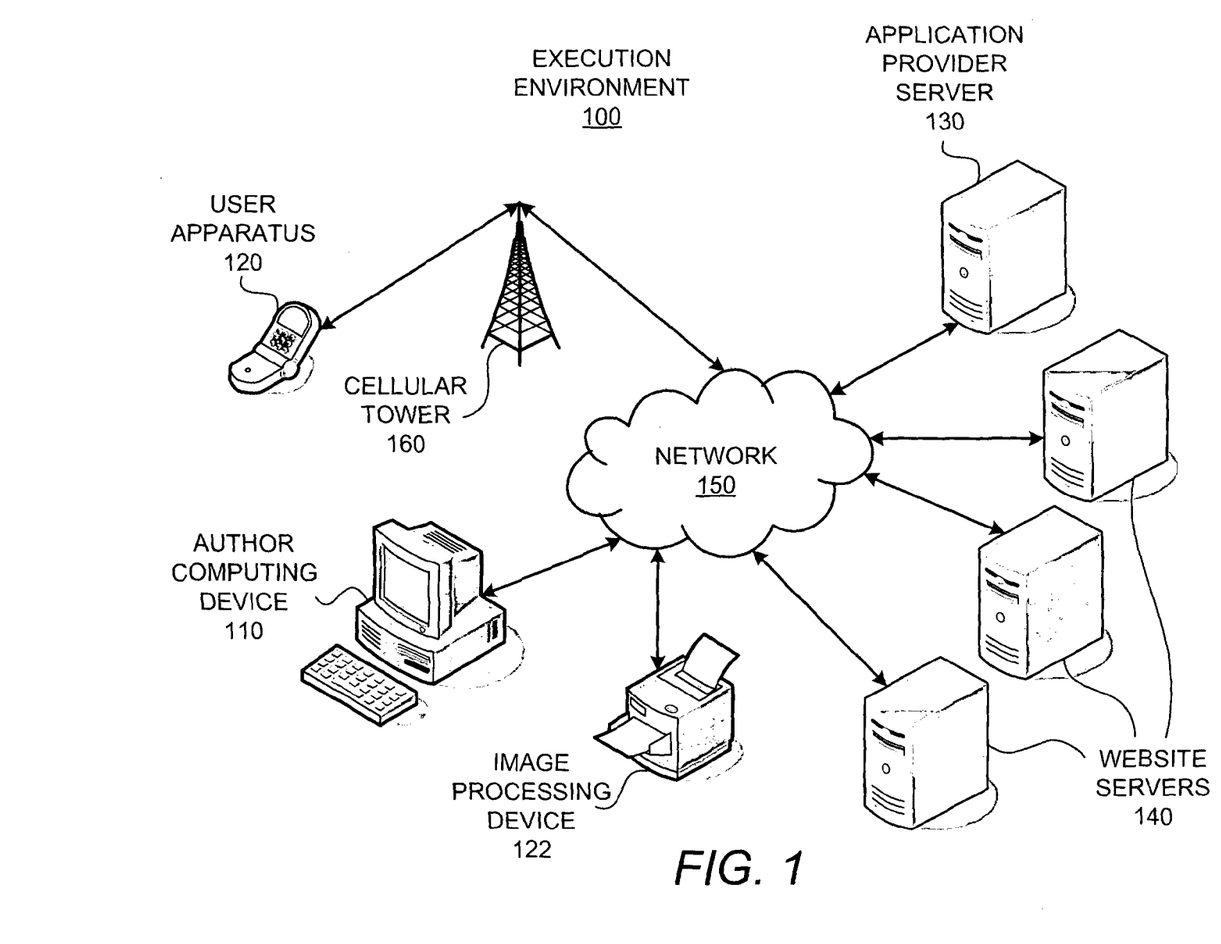
FIG. 1 illustrates a simplified schematic diagram of an execution environment in which various features of the methods and apparatuses disclosed herein may be implemented, according to an example of the present disclosure.

With reference first to FIG. 1, there is shown a simplified diagram of an execution environment 100 in which various features of the methods and apparatuses disclosed herein may be implemented, according to an example. It should be readily apparent that the diagram depicted in FIG. 1 represents a generalized illustration and that other components may be added or existing components may be removed, modified or rearranged without departing from a scope of the execution environment 100.

The execution environment 100 is depicted as including an author computing device 110, a user apparatus 120, an image processing device 122, an application provider server 130, and website servers 140. The author computing device 110, the user apparatus 120, and the image processing device 122 are also depicted as being in communication with the application provider server 130 and the website servers 140 through a network 150, which may comprise, for instance, the Internet. The user apparatus 120 is also depicted as being in communication with the network 150 through a cellular tower 160, but may connect to the network 150 through other wired and wireless connections, such as, through wifi, through a wireless or wired connection to a computing device that is directly connected to the network 150, etc.

The author computing device 110 generally comprises a multi-purpose computing apparatus that may be implemented to execute machine-readable instructions for enabling automatic triggering of a web service operation as discussed in greater detail herein below. More particularly, for instance, the author computing device 110 comprises a personal computer, a workstation, a laptop computer, a tablet computer, a personal digital assistant, a cellular telephone, etc. In addition, the author computing device 110 may comprise a camera or may be in communication with a camera, scanner, or other image capturing device. Otherwise, the author computing device 110 may receive images through the network 150 or through removable data storage devices, such as, hard disks, flash memory devices, etc.

The user apparatus 120 generally comprises an electronic apparatus that may be implemented to execute machine-readable instructions for automatically triggering a web service operation as described in greater detail herein below. The user apparatus 120 may also comprise a personal computer, a workstation, a laptop computer, a tablet computer, a personal digital assistant, a cellular telephone, etc., and may also be equipped to capture and/or receive images. According to a particular example, the user apparatus 120 comprises a cellular telephone or other portable electronic device with image capturing capabilities.

The image processing device 122 generally comprises a device that is able to scan documents and in certain examples, to generate images on documents. In this regard, the image processing device 122 may comprise an image scanner, a multifunction printing and scanning device, etc.

The application provider server 130 may have stored thereon various applications composed of machine-readable instructions and may be considered as a cloud computer. The various applications may include applications containing machine-readable instructions to be executed on at least one of the author computing device 110, the user apparatus 120, and the image processing device 122. As described in greater detail herein below, the various machine-readable instructions may be downloaded onto at least one of the author computing device 110, the user apparatus 120, and the image processing device 122 for execution thereon. Alternatively, the author computing device 110, the user apparatus 120, and/or the image processing device 122 may execute the machine-readable instructions over the cloud, for instance, on the application provider server 130.

The website servers 140 generally have stored thereon machine-readable instructions for providing web-based services through various websites or web portals. More particularly, for instance, the website servers 140 provide users of various types of computing devices with the ability to view and interact with websites, which may include, for instance, websites of financial institutions, utility companies, transportation companies, computing device and services companies etc. In one regard, the website servers 140 may be assigned particular universal resource locators (URLs) and users may access the website servers 140 through input of the URLs in any of a plurality of web browsers running on the user apparatus 120, the author computing device 110, and/or the image processing device 122.

Figure 2:
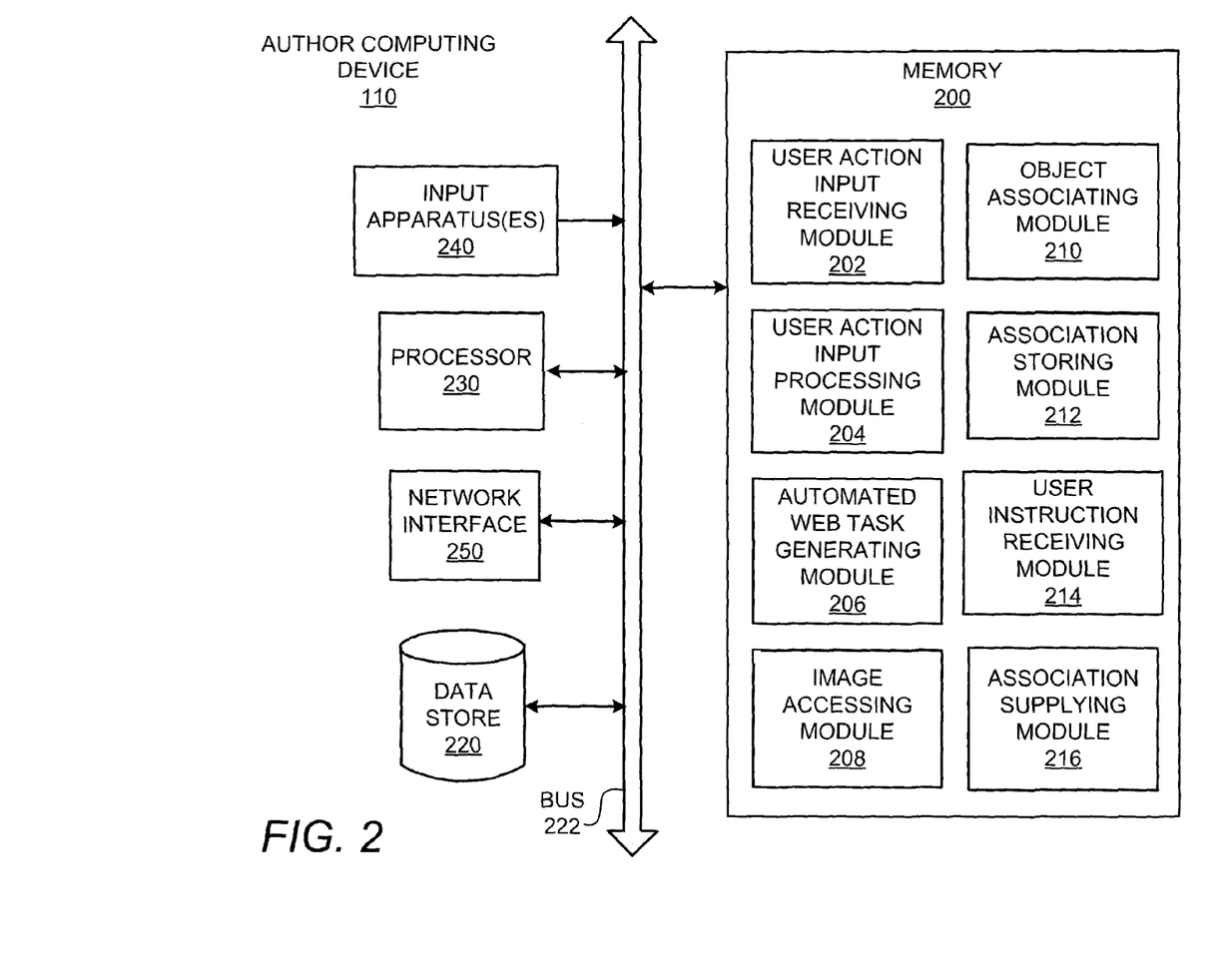
FIG. 2 shows a simplified block diagram of the author computing device depicted in FIG. 1, according to an example of the present disclosure.

With particular reference now to FIG. 2, there is shown a simplified block diagram of the author computing device 110, according to an example. It should be apparent that the block diagram depicted in FIG. 2 represents a generalized illustration and that other components may be added or existing components may be removed, modified or rearranged without departing from a scope of the author computing device 110.

As shown in FIG. 2, the author computing device 110 includes a memory 200, a data store 220, a processor 230, input apparatus(es) 240, and a network interface 250. Each of these components is operatively coupled to a bus 222, which may be, for instance, an EISA, a PCI, a USB, a FireWire, a NuBus, a PDS, etc. The memory 200 may comprise for instance, a hard disk drive, a removable disk drive, such as, a floppy disk, a CD-ROM, a DVD-ROM, or other optical or magnetic media, a solid state drive, etc. Although not shown, the memory 200 may also store an operating system, network applications, etc. In any event, the memory 200 is depicted as including machine-readable instructions stored thereon. The machine-readable instructions include a user action input receiving module 202, a user action input processing module 204, an automated web task generating module 206, an image processing module 208, an object associating module 210, an association storing module 212, a user instruction receiving module 214, and an association supplying module 216. The modules 202-218 may comprise software modules, hardware modules, or a combination of software and hardware modules. Thus, in one example, at least one of the modules 202-216 comprises a circuit component. In another example, at least one of the modules 202-216 comprises machine-readable code stored on the memory 200, which comprises a non-transitory computer readable storage medium, which is executable by the processor 230.

As further shown in FIG. 2, the processor 230 is to receive input from an input apparatus(es) 240. The input apparatus (es) 240 may comprise, for instance, a keyboard, a mouse, a trackpad, an image scanner, an image capture device, etc. Various information inputted through the input apparatus(es) 240 may be stored in the data store 220, which may comprise volatile and/or non-volatile memory, such as DRAM, EEPROM, MRAM, phase change RAM (PCRAM), Memristor, flash memory, and the like. In addition, or alternatively, the data store 220 may comprise a device to read from and write to a removable media, such as, a floppy disk, a CD-ROM, a DVD-ROM, or other optical or magnetic media.

The author computing device 110 also includes a network interface 250 through which the author computing device 110 may connect to the network 150 and therefore to the servers 130, 140 connected to the network 150.

Figure 3:
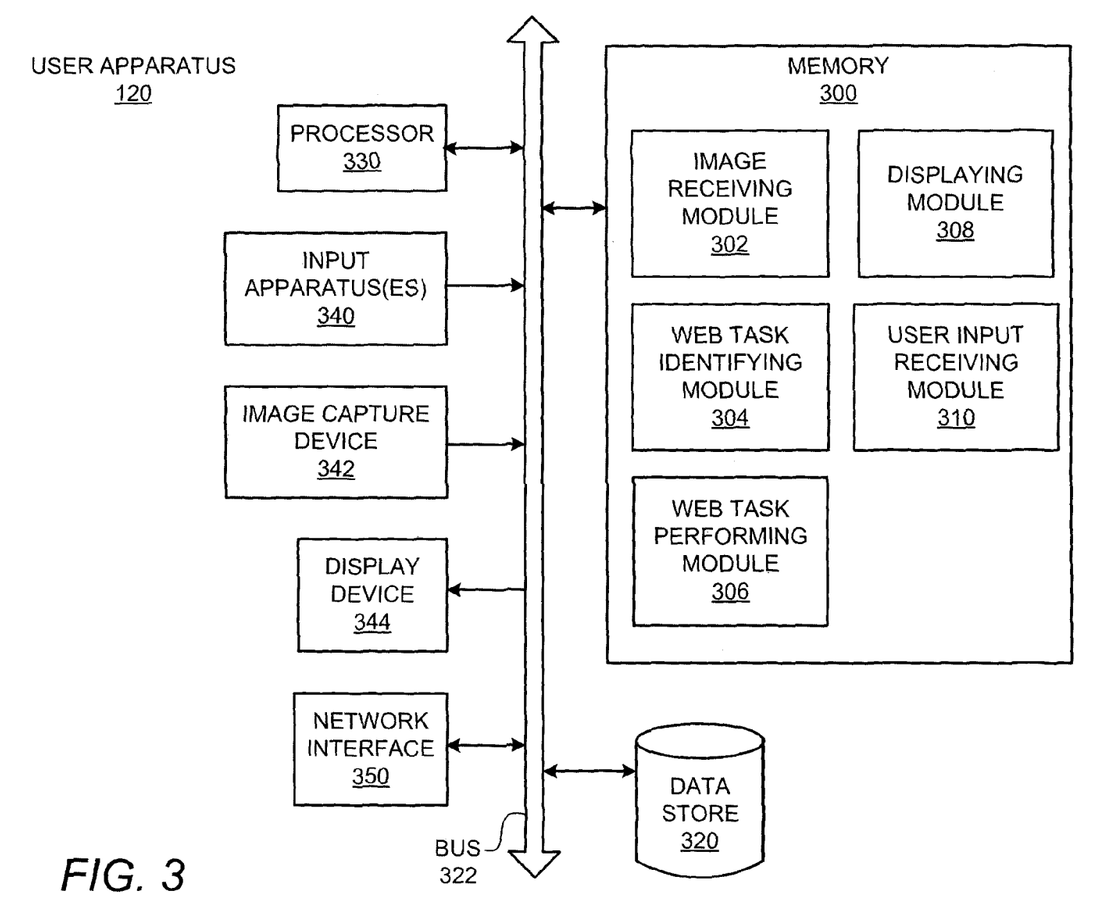
FIG. 3 shows a simplified block diagram of the user apparatus depicted in FIG. 1, according to an example of the present disclosure.

Turning now to FIG. 3, there is shown a simplified block diagram of the user apparatus 120, according to an example. It should be apparent that the block diagram depicted in FIG. 3 represents a generalized illustration and that other components may be added or existing components may be removed, modified or rearranged without departing from a scope of the user apparatus 120.

As shown in FIG. 3, the user apparatus 120 includes a memory 300, a data store 320, a processor 330, input apparatus(es) 340, an image capture device 342, a display device 344, and a network interface 350. Each of these components is operatively coupled to a bus 222, which may be, for instance, an EISA, a PCI, a USB, a FireWire, a NuBus, a PDS, etc. The memory 300 may comprise for instance, a hard disk drive, a removable disk drive, such as, a floppy disk, a CD-ROM, a DVD-ROM, or other optical or magnetic media, a solid state drive, etc. Although not shown, the memory 200 may also store an operating system, network applications, etc. In any event, the memory 300 is depicted as including machine-readable instructions stored thereon. The machine-readable instructions include an image receiving module 302, an image matching module 304, a web task performing module 306, a displaying module 308, and a user input receiving module 310. The modules 302-310 may comprise software modules, hardware modules, or a combination of software and hardware modules. Thus, in one example, at least one of the modules 302-310 comprises a circuit component. In another example, at least one of the modules 302-310 comprises machine-readable code stored on the memory 300, which comprises a computer readable storage medium, which is executable by the processor 330.

As further shown in FIG. 3, the processor 330 is to receive input from an input apparatus(es) 340 and to receive images captured by the image capture device 342, which may comprise a camera either integrated with or separate from the user apparatus 120. The input apparatus(es) 240 may comprise, for instance, a keyboard, a mouse, a trackpad, etc. Various information inputted through the input apparatus(es) 340 may be stored in the data store 320, which may comprise volatile and/or non-volatile memory, such as DRAM, EEPROM, MRAM, phase change RAM (PCRAM), Memristor, flash memory, and the like. In addition, or alternatively, the data store 320 may comprise a device to read from and write to a removable media, such as, a floppy disk, a CD-ROM, a DVD-ROM, or other optical or magnetic media.

The user apparatus 120 also includes a network interface 350 through which the user apparatus 120 may connect to the network 150 and therefore to the servers 130, 140 connected to the network 150. The user apparatus 120 may also or instead access the cellular tower 160 through the network interface 350 to connect to the network 150.

Although particular reference has been made with respect to FIG. 3 as depicting the user apparatus 120, FIG. 3 may also depict the image processing device 122 without departing from a scope of the elements depicted in FIG. 3. In this regard, the image processing device 122 may implement some of the same functions as the user apparatus 120 discussed herein.

According to an example, the modules 202-216 and 302-310 may comprise parts of applications that may be downloaded onto the author computing device 110 and/or the user apparatus 120 from the application provider server 130. In this example, the applications may be available, for instance, from a application store. According to another example, the application containing the modules 202-216 and 302-310 may be installed onto the author computing device 110 and/or the user apparatus 120 from a removable data storage device or may have been pre-installed onto the author computing device 110 and/or the user apparatus 120. As a further alternative, the modules 202-216 and 302-310 may comprise parts of applications stored in a cloud computer and the author computing device 110 and/or the user apparatus 120 may access and implement the modules 202-216 and 302-310 through communication with the cloud computer, for instance, the application provider server 130. In this example, the 202-216 and 302-310 are executed or implemented in the cloud computer.

Figure 4:
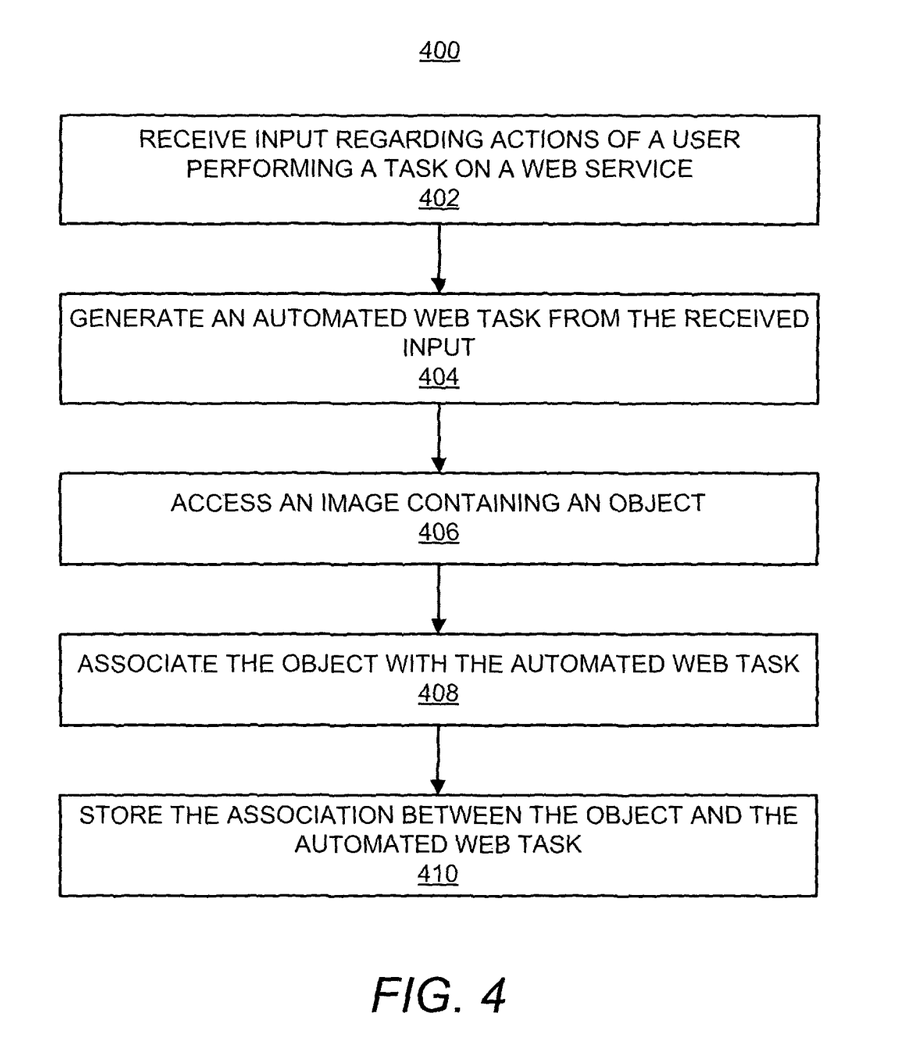
FIGS. 4 and 5, respectively, show flow diagrams of methods for automatically performing a web service operation, according to examples of the present disclosure.
Figure 5:
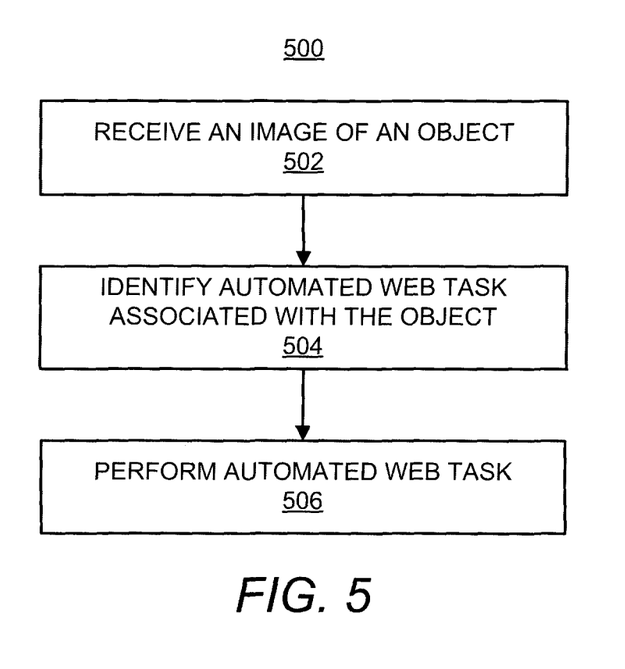

Various manners in which the processors 230, 330 may respectively implement the modules 202-216 and the modules 302-310 are described in greater detail with respect to FIGS. 4 and 5, which, respectively depict flow diagrams of methods 400 and 500 for automatically performing a web service operation, according to an example. It should be apparent that the methods 400 and 500 represent generalized illustrations and that other operations may be added or existing operations may be removed, modified or rearranged without departing from the scopes of the methods 400 and 500.

The descriptions of the methods 400 and 500 are made with particular reference to the author computing device 110 and the user apparatus 120 depicted in FIGS. 1-3. It should, however, be understood that the methods 400 and 500 may be implemented in apparatuses that differ from the author computing device 110 and the user apparatus 120 depicted in FIGS. 1-3 without departing from the scopes of the methods 400 and 500. For instance, the methods 400 and/or 500 may be implemented in the image processing device 122. In addition, the methods 400 and/or 500 may be implemented in either or both of the author computing device 110 and/or the user apparatus 120. Thus, for instance, both of the methods 400 and 500 may be implemented in the same apparatus 110, 120, 122.

Generally speaking, the method 400 pertains to authoring, for instance, on the author computing device 110, an automated web task that is to perform a web service operation when triggered. The method 500 pertains to performing the automated web task on an apparatus, such as, for instance, the user apparatus 120 and/or the image processing device 122. Although the methods 400 and 500 have been depicted and described as being implemented separately from each other, it should be understood that the methods 400 and 500 may be implemented together without departing from scopes of the methods 400 and 500. In this regard, the method 500 may be implemented following performance of the method 400, for instance, by the same or different apparatuses.

Figure 6:
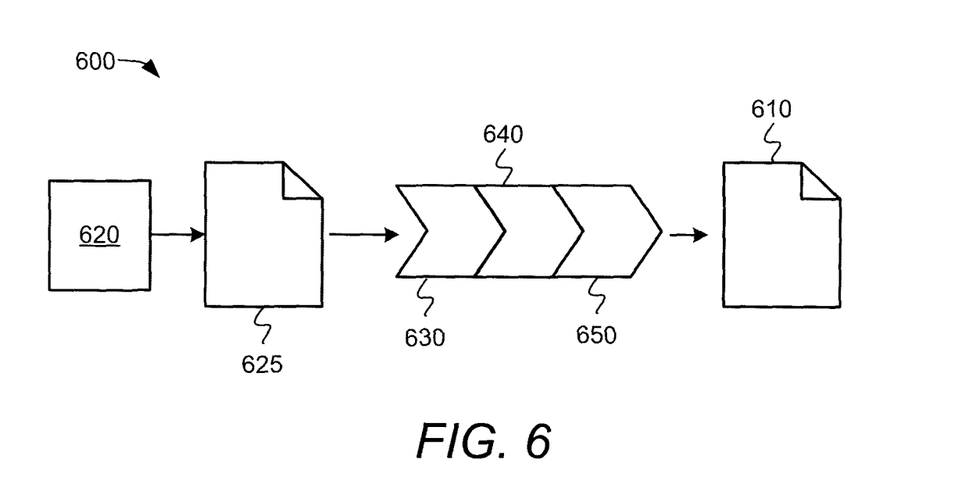
FIG. 6 shows a diagram of an authoring environment for generating an automated web task, according to an example of the present disclosure.

With reference first to the method 400, at block 402, input regarding actions of a user performing a task on a web service is received, for instance, by the user action input receiving module 202. More particularly, for instance, a TaskLet is implemented on the author computing device 110, for instance, in the user action input processing module 204, that tracks and stores the author's interactions on the author computing device 110. For instance, and with reference to FIG. 6, there is shown a diagram of an authoring environment 600 for generating an automated web task 610, according to an example. As shown in FIG. 6, a recording process 620 may be implemented that records the author's (or user's) web browser interactions 625. To achieve this, the web browser application may be modified to record the author's web browser actions by recording the user actions into a file. For example, a user's click of a button may be recorded by the modified web browser as 'button-click at x=100, y=200, wherein the values of the x and y variables records the x and y coordinates of the cursor when the button was clicked. Alternatively, a browser plug-in may be added into a web browser so as to record a user's web browser actions. The plug-in modifies HTML pages shown to the user to introduce java-scripts at all 'actionable' elements of the HTML DOM tree. Any action on this modified HTML page will be captured and written out like example provided above for the modified web browser.

The user's web browser actions 625 are then parsed and analyzed to remove the instance-level detail. More specifically, the user's web browser actions 625 undergo a cleaning process 630. In the cleaning process 630, the user's web browser actions 625 are converted to a semantic form where "button click at x=100 y=200" is converted into a semantic representation such as "SUBMIT form=employee-registration", for example. This is achieved using a web browser action code parser together with a HTML analyzer that associates the 'click actions' to 'DOM structure of the web page'. Certain elements of these new representations may contain input parameters, such as "TEXT_INPUT John as name" having "John" as a potential input parameter. Also, "HYPERLINK Gemini" may have 'Gemini' as a potential input 'Gemini'. Such elements that may be represented as parameters are automatically identified and are replaced with variable names in the semantic representation. "TEXT_INPUT $var1 as name"

The results of the cleaning process 630 are then passed to a parameterization process 640 which introduces variables instead of specific instance values. At the end of the cleaning process 630, a list of possible input parameters for a specific interaction pattern is generated, which may then be used to determine a list of free and bound variables for the web task. A free variable is one which may change its value on future execution of the web task, while a bound variable of a task typically retains its value across multiple executions of the task. For example, the user may be prompted to specify if, for subsequent runs, they wish to be able to change parameters such as 'date' and/or 'destination' of a flight booking TaskLet. Alternatively, the user may be asked to perform the action multiple times with different input parameters and the system may automatically determine the free and bound variables by analyzing the differences in the inputs used on multiple recordings. The task is now represented as a script template together with a set of files defining free/bound variables and the action-analysis data. Of course, it will be appreciated that the task may be represented using a single script file comprising a representation of the task, variables and action-analysis data. This new representation of web interactions may be treated as new language for programming web-based applications, where each web action is an instruction and variables represent potential alternative actions on web pages. Further since the above program itself was not programmer-written, but was automatically generated when the user performed the web actions using a web browser, it is an instance of a technical area called Programming-By-Demonstration or Programming-By-Example, here performed in the context of web interactions.

The results of the parameterization process 640 are then passed to a TaskLet generator 650 which generates the automated web task 610 which primarily includes a TaskLet Template Script (TTS) file, representing the user actions. The task model may also comprise further files defining free and/or bound variables and user data, for example.

The TTS supports replay of user's task (the recorded user interaction with multiple web sites) at a later time based upon new values provided for variables using possibly new modes of interaction (such as SMS, for example). The authoring environment 600 comprises a plurality of modules, each being appropriately adapted to perform a function which supports generations of web tasks. By way of example, a web task authoring environment comprises an Input Format Handler (IFH) module, a task generalizer module, an action analyzer, a variable generator, a web page analyzer, and a user data parameterizer. In addition, the modules depicted in the authoring environment 600 may form part of the automated web task generating module 206.

While the primary form of generating a web task is through Programming by-demonstration (by recording the user actions on the web browser), alternate mechanisms to specify the web task or user actions, such as human written instructions provided either directly in the TaskLet script language or in a natural language, or any other graphical tool or User Interface (UI) that enables the user to specify actions defining a web task or user interaction with a web service may be implemented. Every such different way of task input will be processed by an Input Format Handler (IFH) adapted to handle many input formats of input actions.

A web page analyzer is used to analyze the web pages on which the actions were performed in order to extract and add to semantics of the task. For example, the visual labels for widget inputs are extracted from the page semantics for every free variable. A user data parameterizer is provided as a graphical interface allowing a user to identify changing variables (and possible values for the variable) across multiple tasks/interactions.

At block 404, the automated web task 610 is generated from the received input, in which the automated web task 610 is to perform the received actions, for instance, by the automated web task generating module 206. The automated web task generating module 206 may generate the automated web task as discussed above with respect to the authoring environment 600. The automated web task generating module 206 may also associate various user inputs that identify fields of interest within the automated web task 610. The various user inputs may include, for instance, identification of a logo, identification of various fields of interest contained in the object, which may comprise, for instance, a document, such as, a utility bill, a mortgage bill, a train ticket, an airline ticket, printed forms to place a classified advertisement, book a train ticket, register a complaint, apply for a loan, etc.

In one example, the fields of interest have fixed positions within the document and thus, the fields of interest are positioned at the same locations in other similar documents. In another example in which the document has a variable layout whose structure may vary widely from vendor to vendor, handwritten or other user-generated notations may be provided on the document. In addition, the handwritten or user-generated notations may be provided to specify and/or populate the fields of interest. In this example, the handwritten or other user-generated notations may be used to distinguish the document from other types of documents to identify and/or comprise the fields of interest in the document. In addition, or alternatively, the handwritten or other user-generated notations may be used to identify fields of interest and/or content of the fields of interest in documents that have variable or unstructured layouts. Thus, for instance, data contained within circled portions of a document may be identified as being a field of interest. As another example, handwritten content may be identified as forming a field of interest in the document. Thus, for instance, a user may fill in certain fields of interest by hand, such as, to provide handwritten information on a printed form to book a train ticket. According to an example, the user input processing module 204 may implement intelligent character recognition (ICR) to recognize the handwritten or user-generated notations provided on the document.

As another example, the object may comprise a physical object other than a document. For instance, the object may comprise a billboard, a printer, newspaper advertisement, etc. In this example, similar to the example above pertaining to a document having a variable layout, handwritten or other user-generated notations may be provided on the object or on the image of the object to distinguish the object from other objects. In addition, the automated web task may be associated with the physical object using the handwritten or other user-generated notation. In this regard, the automated web task may be associated with handwritten or other user-generated notations.

In any regard, the author may have substantial control over the handling of the information contained in the fields of interest. For instance, the user instruction receiving module 214 may receive instructions indicating that the characters in at least one of the fields of interest are to be automatically populated into a portion of the web service during operation of the automated web task 610. Thus, for instance, the user instruction receiving module 214 may receive instructions that the account number from the document is to be automatically inputted into the appropriate space on a utility company's website. In another example, the user instruction receiving module 215 may receive instructions that characters in at least one of the fields of interest are to be hidden and therefore to prevent the characters from automatically being populated into a portion of a web service during operation of the automated web task 610. Thus, for instance, the user instruction receiving module 214 may receive instructions to prevent the payment amount from being automatically populated into a payment amount space on a utility company's website.

According to an example, a plurality of automated web tasks associated with the object may be generated at block 404. In this example, the user action input receiving module 202 may track and record multiple interactions of the user with a web service associated with the object and the automated web task generating module 206 may generate multiple automated web tasks associated with the object.

At block 406, an image containing an object is accessed, for instance, by the image accessing module 208. The image accessing module 208 may access the image from any of a plurality of different sources. For instance, the image may be captured by an image capture device that is integrated with or separate from the author computing device 110 and the author computing device 110 may receive the captured image. Alternatively, the author computing device 110 may obtain the image from the data store 220 or from an external location, such as, from a database or website, to which the author computing device 110 is connected through the network 150.

At block 408, the object contained in the image is associated with the automated web task 610, for instance, by the object associating module 210, to cause the automated web task to be automatically performed by another image containing the object. More particularly, the object associating module 210 may map the object to the automated web task 610 such that imaging of the object automatically retrieves the automated web task 610. In addition, the object associating module 210 may map the fields of interest to various parameters of the automated web task 610. That is, for instance, the object associating module 210 may map the account number to the account number entry of the web service. In this regard, various information contained in the fields of interest may either automatically be populated into the appropriate spaces of a website and/or prevented from being automatically inserted.

At block 410, the association between the object and the automated web task 610 is stored, for instance, by the association storing module 210. The association storing module 210 may store the association between the object locally in the data store 220. In addition, or alternatively, the association between the object and the automated web task 610 may be supplied to, for instance, the application providing server 130 by the association supplying module 216 to thus enable the association, which may also include an image of the object and the automated web task 610, to be available for other users to retrieve from the application provider server 130. According to an example, the author computing device 110 is part of the application provider server 130 and thus, the automated web task 610 and the association between the object and the automated web task 610 may be authored by a person having access to the application provider server 130.

Turning now to FIG. 5, at block 502, an image of an object is received, for instance, by the image receiving module 302. According to an example, the image receiving module 302 receives the image of the object from the image capture device 342. In this example, a user may capture an image of a document using the image capture device 342 of the user apparatus 120. In other examples, the image receiving module 302 may receive the image of the object from other sources, including, for instance, the data store 320 or from a remote location.

At block 504, an automated web task associated with the object is identified, for instance, by the web task identifying module 304. More particularly, the web task identifying module 304 may identify a feature of the object contained in the received image, for instance, through implementation of an image recognition operation, and may use the feature to identify the automated web task from a list of possible automated web tasks. By way of example, the web task identifying module 304 may identify that the object contains a feature that substantially matches a previously stored template, logo, handwritten or other user-generated indicator, etc. In addition, the user may be presented with a list of available automated web tasks associated with the object, which the user may select for implementation on the user apparatus 120.

At block 506, the automated web task 610 associated with that object is performed, for instance, by the web task performing module 306. The performance of the automated web task 610 may include automatically visiting the web site contained in the automated web task 610 and the automatic population of information from at least one field of interest of the object contained in the received image. Thus, for instance, various information, such as, the user's account number may be retrieved from the object and may automatically be inputted into the appropriate space of the website as identified by the automated web task 610.

In addition, or alternatively, various prompts for user input may be displayed on the display device 344 by the displaying module 308. More particularly, for instance, the displaying module 308 may display the visited website on the display device 344 and may also display prompts for various information, such as, a password, a scheduled payment date, etc. The additional prompts may also include, for instance, other options, such as, contacting a representative of the company whose website has been accessed, retrieving previous payment information, accessing account information, etc. In addition, the user's inputs may be received by the user input receiving module 310.

According to a particular example, the user apparatus 120 comprises a portable hand-held device, such as, a smart cellular telephone, that has a relatively small display screen. In this regard, the user may simply capture an image of the object, for instance, a utility company bill, a mortgage company bill, etc., and the web task may automatically access the appropriate website for that document. In addition, the web task may automatically insert at least one field of interest, for instance, the user's account number, into the appropriate field on the website. As such, the user may not be required to input various information through the user apparatus 120.

Some or all of the operations set forth in the figures may be contained as a utility, program, or subprogram, in any desired computer readable storage medium. In addition, the operations may be embodied by machine-readable instructions. For example, they may exist as machine-readable instructions in source code, object code, executable code or other formats. Any of the above may be embodied on a computer readable storage medium, which include storage devices.

Exemplary non-transitory computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, in which the present disclosure is intended to be defined by the following claims—and their equivalents—in which all terms are mean in their broadest reasonable sense unless otherwise indicated.

What is claimed is:

1. A method for automatically performing a web service operation, said method comprising:
    receiving input regarding actions of a user performing a task on an existing web service;
    generating, by a processor, an automated web task from the received input, wherein the automated web task is to perform the received actions of the user;
    accessing an image containing an object;
    associating the object contained in the image with the automated web task; and
    storing the association between the object and the automated web task in a data store with instructions that subsequent presentation of another image that includes the object will initiate the automated web task and performance of the received actions.

2. The method according to claim 1, wherein the object comprises a document, said method further comprising:
    receiving an input identifying at least one field of interest in the document; and
    associating the received input identifying the at leas one field of interest with the automated web task.

3. The method according to claim 2, wherein the at least one field of interest comprises at least one element that has a fixed position in the document, such that other similar documents have the same at least one field of interest in a similar fixed position.

4. The method according to claim 2, wherein the at least one field of interest comprises characters, said method further comprising: receiving input indicating that the characters in the at least one field of interest are to be automatically populated in a portion of the web service during operation of the automated web task.

5. The method according to claim 2, wherein the at least one field of interest comprises characters, said method further comprising: receiving input to hide the characters in the at least one field of interest to prevent the characters from automatically being populated into a portion of the web service during operation of the automated web task.

6. The method according to claim 2, further comprising: receiving input identifying data to be automatically extracted from the document and inserted into a web service during operation of the web task.

7. The method according to claim 2, wherein at least one of the input identifying at least one field of interest and contents of the at least one field of interest in the document comprises at least one of a handwritten and a user-generated notation.

8. The method according to claim 1, further comprising:
    receiving an image of a second object;
    identifying the automated web task associated with the second object; and
    performing the automated web task associated with the second object to provide the web service operation.

9. The method according to claim 1, further comprising supplying the association between the object and automated web task to another user who may then invoke the automated web task by presenting an image that includes the object.

10. The method of claim 1, wherein the automated web task comprises accessing a utility company website and paying for a utility bill using a paper copy of the utility bill as said object in the image.

11. The method of claim 1, wherein the automated web task comprises accessing a service provide website and paying an invoice from that service provider using a paper copy of the invoice as said object in the image.

12. The method of claim 1, wherein the received actions are actions performed by the user with a web browser accessing a particular webpage.

13. The method of claim 12, further comprising analyzing the user's web browser actions to remove instance-level detail.

14. An apparatus for automatically performing a web service operation, said apparatus comprising:
  a module to receive input regarding actions of a user performing a task on an existing web service, to generate an automated web task from the received input, wherein the automated web task is to perform the received actions, to access an image containing an object, to associated the object contained in the image with the automated web task, and to store the association between the object and the automated web task; and
  a processor to implement the module.

15. The apparatus according to claim 14, wherein the object comprises a document, said module being further to receive an input identifying at least one field of interest in the document and to associate the received input identifying the at least one field of interest with the automated web task.

16. The apparatus according to claim 14, wherein the module is further to analyze the input regarding actions of the user to determine semantics and at least one variable describing the user actions, to represent the semantics and the at least one variable in at least one script file, the at least one script file supporting performance of user interaction with the web service based on the semantics and a value provided for the variable, and wherein the object contained in the image is associated with the at least one script file such that the script file is automatically performed by the image containing the object.

17. The apparatus according to claim 14, further comprising: an image receiving device to receive an image of a second object; a second module to determine whether the second object is similar to the object associated with the automated web task, and to perform the automated web task to provide a web service operation on the apparatus in response to a determination that the second object substantially matches the object associated with the automated web task.

18. The apparatus according to claim 17, wherein the object comprises a document and wherein the module is further to identify at least one field of interest in the document and to implement information contained in the at least one field of interest in the performance of the automated web task.

19. A non-transitory computer readable storage medium on which is embedded a computer program, said computer program implementing a method for enabling automatic performing of a web service operation, said computer program comprising a set of instructions to:
  receive an image of an object;
  identify an automated web task associated with the object, wherein the automated web task has been generated from received input regarding actions of a user performing a task available on an existing web service by using that existing web service; and perform the automated web task to provide the web service operation.

20. The computer readable storage medium according to claim 19, said computer program further comprising a set of instructions to: receive input regarding actions of a user performing a task on a web service; generate the automated web task from the received input; access another image containing the another object; associate the another object contained in the another image with the web task; and store the association between the another object and the automated web task.

* * * * *

UNITED STATES PATENT AND TRADEMARK OFFICE
CERTIFICATE OF CORRECTION

| | | |
|---|---|---|
| PATENT NO. | : 9,600,456 B2 | Page 1 of 1 |
| APPLICATION NO. | : 14/342314 | |
| DATED | : March 21, 2017 | |
| INVENTOR(S) | : Madhvanath Sriganesh et al. | |

It is certified that error appears in the above-identified patent and that said Letters Patent is hereby corrected as shown below:

In the Claims

In Column 12, Line 16, in Claim 2, delete "leas" and insert -- least --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*